Figure 1:
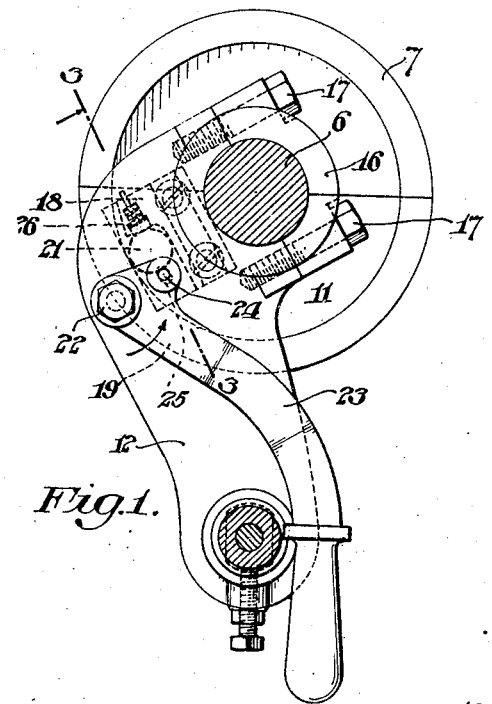

Aug. 3, 1926.

A. E. LOEWY 1,594,890

AUTOMATIC STOP

Filed June 11, 1924

Inventor.
Aaron E. Loewy,
By
Attorney.

Patented Aug. 3, 1926.

1,594,890

UNITED STATES PATENT OFFICE.

AARON E. LOEWY, OF PHILADELPHIA, PENNSYLVANIA, ASSIGNOR TO LIBERMAN MANUFACTURING COMPANY, A CORPORATION OF DELAWARE.

AUTOMATIC STOP.

Application filed June 11, 1924. Serial No. 719,258.

My invention relates to improvements in automatic stops. The object is to provide improved automatic means for preventing reverse movement of a rotating element, such as a shaft, when the normal forward movement of the same has been arrested, and, at the same time, to provide means for arbitrarily rendering said stopping means ineffective, when it is desired arbitrarily to cause the reverse movement of said element.

The invention is especially applicable for the control of a driving shaft, used for driving a number of machines, such for example as knitting machines, where it becomes necessary at times to stop the movement of the shaft quickly and at the same time, to prevent any back-lash or reverse movement, which would result in damage to the threads of the several machines.

The particular significance of the device is that its action is instantaneous and practically absolute; and also that this action is subject to arbitrary control whereby the elements may be rendered ineffective to permit reverse movement during any required period of time.

Referring to the drawings which illustrate, merely by way of example suitable means for effecting the invention—

Figure 4:
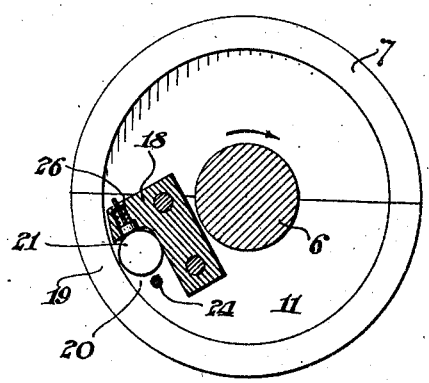
Figure 3:
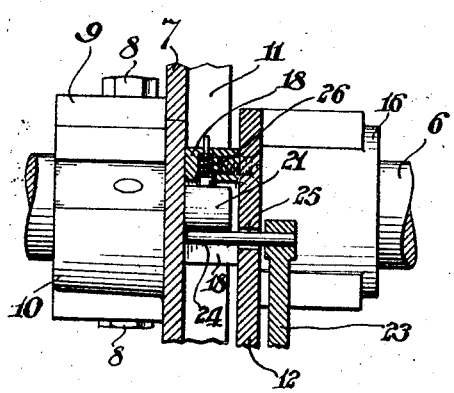
Figure 2:
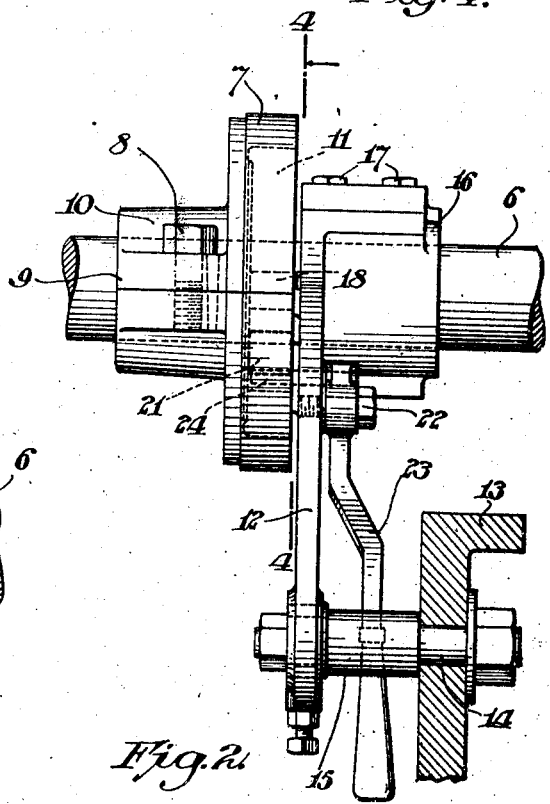

Fig. 1 is a plan view.
Fig. 2 is a side elevation.
Fig. 3 is a section on line 3—3 of Fig. 1.
Fig. 4 is a section on line 4—4 of Fig. 2.

Similar numerals refer to similar parts throughout the several views.

In the example illustrated, the shaft 6 is the element to be controlled. This shaft may be the means of transmitting power from a suitable source to a machine or a number of machines. To this shaft 6 is secured a flanged or recessed disc or wheel 7, preferably made in two parts for convenience of assembly. The parts or halves forming wheel 7 are clamped rigidly to the shaft 6 by means of the bolts 8 secured in the flanges 9 of the hub 10 of said disc or wheel 7. This disc or wheel 7 is recessed, as to one side, to provide the annular chamber 11, surrounding the shaft 6.

A bracket 12 is secured to a stationary part, such as 13, by means of the bolt 14 and spacing collar 15. This bracket 12 is loosely clamped to the shaft 6 by means of the keeper 16 and screws 17. To the underside of bracket 12 is secured a block 18 projecting into chamber 11 of wheel 7 and having its underside in L-shaped form as shown in Fig. 4. The recessed part of block 18 forms with the surrounding rim or flange 19 of disc 7, a pocket 20 of decreasing width for the roller 21, preferably of case hardened steel. A spring plunger 26 is placed in a recessed part of block 18 for engaging the roller 21 to urge the same toward the narrow part of the pocket 20.

Upon the bracket 12 is pivotally secured on the tap screw 22, the hand lever 23, carrying the pin 24 projecting through a slot or slightly enlarged opening 25, clearly shown in Fig. 3, in bracket 12, into the pocket 20 and adapted to engage the roller 21. The tension of the head of the tap screw 22 upon the hand lever 23 maintains said lever in any position to which it is arbitrarily moved.

*In operation.*—While the shaft 6 and disc or wheel 7 rotate normally in clockwise direction, the roller assumes, and is maintained by the action thereon of the clockwise movement of the flange 19, in a position sufficiently near the larger end of pocket 20 to offer no obstruction to said rotation. The moment this clockwise movement of shaft 6 and flange 19 is arrested, the spring plunger 26 forces the roller 21 into the contracted end of pocket 20, that is in the locking position.

The position of the roller 21, when the parts are rotating normally, is approximately that shown in Fig. 4. The pin 24 however is not in contact with the roller 21 as shown in this figure when the parts are rotating normally. When the normal rotation of shaft 6 is stopped, any tendency of back-lash or reverse movement of the shaft is prevented by the roller 21 instantly assuming the position indicated in Fig. 1, in which it locks between the long side of block 18 and the adjacent wall of flange 19, that is, in the narrower part of the tapered pocket 20. The distances or clearance between the roller 21 and the said adjacent walls are extremely minute. The locking action is practically instantaneous and absolute and this locking action is obviously equally effective at every moment of shaft revolution, at which the stopping may occur.

In order to secure the greatest possible efficiency the maximum distance or separation between the roller periphery and an adjacent wall is approximately ten one thousandths of an inch.

When it is desired however to cause a reverse rotation of shaft 6, it is necessary to prevent this locking action of roller 21, and this is accomplished by operating the hand lever 23, carrying the pin 24, to push the roller 21 into the position shown in Fig. 4, so that, in this position of the roller 21, the shaft 6 is free to move in either direction. The tap-screw 22 which forms the fulcrum or pivot bearing of lever 23 is sufficiently tight to exert a tension or pressure between the head of the screw and the lever 23 to maintain or hold by friction said hand lever 23 in any position to which it has been arbitrarily moved by hand, until again operated. It follows that when the lever 23 is moved to push roller 21 into the wider end of pocket 20, the roller is locked in said position until the lever is again arbitrarily actuated.

Either gravity or a spring, such as 26, may be utilized for urging the roller toward the narrow part of the tapered pocket 20.

What I claim is:—

1. In an automatic stop, the combination of a rotatable shaft, a recessed disc rigidly secured thereto, having a peripheral flange, a stationary block supported within the recess of the disc and forming with the peripheral flange a pocket of decreasing width, a roller within the pocket, of diameter greater than the width of the pocket at one end, and less than the width of the pocket at the other end, as and for the purpose specified.

2. In an automatic stop, the combination of a rotatable shaft, a recessed disc rigidly secured thereto, having a peripheral flange, a stationary block supported within the recess of the disc and forming with the peripheral flange a pocket of decreasing width, a roller within the pocket, of diameter greater than the width of the pocket at one end, as and for the purpose specified, and means for normally urging the roller toward the narrower end of the pocket.

3. In an automatic stop, the combination of a rotatable shaft, a recessed disc rigidly secured thereto, having a peripheral flange, a stationary block supported within the recess of the disc and forming with the peripheral flange a pocket of decreasing width, a roller within the pocket, of diameter greater than the width of the pocket at one end, and less than the width of the pocket at the other end, as and for the purpose specified, means for normally urging the roller toward the narrower end of the pocket and arbitrarily actuated means for restraining said normal movement of the roller.

4. In an automatic stop, the combination of a rotatable shaft, a recessed disc rigidly secured thereto, having a peripheral flange, a stationary block supported within the recess of the disc and forming with the peripheral flange a pocket of decreasing width, a roller within the pocket, of diameter greater than the width of the pocket at one end, and less than the width of the pocket at the other end, as and for the purpose specified, means for normally urging the roller toward the narrower end of the pocket, arbitrarily actuated means for restraining said normal movement of the roller, and an element for exerting pressure on the arbitrarily actuated means, as means for maintaining said arbitrarily actuated means in the position to which it has been arbitrarily moved.

5. The combination with a rotatable element, a chambered formation rigid therewith and a stationary element cooperating therewith to form a pocket decreasing in width in direction opposite the direction of normal rotation of said rotatable element, a roller therein having its diameter greater than one end and less than the other end of said pocket, the roller and pocket being so proportioned and dimensioned that the greatest distance between the roller periphery and the adjacent wall of the pocket shall be approximately ten one thousandths of an inch.

6. The combination with a rotatable element, a chambered formation rigid therewith and a stationary element cooperating therewith to form a pocket decreasing in width in direction opposite the direction of normal of said rotatable element, a roller therein having its diameter greater than one end and less than the other end of said pocket, and spring means acting upon the roller to urge it toward the narrow part of the tapered pocket, and means for arbitrarily forcing the roller to the region of larger dimension in said pocket against the tension of the spring.

AARON E. LOEWY.